United States Patent
Yoo et al.

(10) Patent No.: US 11,848,442 B2
(45) Date of Patent: *Dec. 19, 2023

(54) LITHIUM SECONDARY BATTERY

(71) Applicant: SK ON CO., LTD., Seoul (KR)

(72) Inventors: Kyung Bin Yoo, Daejeon (KR); Duck Chul Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,683

(22) Filed: Dec. 8, 2022

(65) Prior Publication Data

US 2023/0107279 A1    Apr. 6, 2023

Related U.S. Application Data

(63) Continuation of application No. 16/845,933, filed on Apr. 10, 2020, now Pat. No. 11,581,533.

(30) Foreign Application Priority Data

Apr. 12, 2019 (KR) .................. 10-2019-0042856

(51) Int. Cl.
| | |
|---|---|
| *H01M 4/505* | (2010.01) |
| *H01M 10/052* | (2010.01) |
| *H01M 4/36* | (2006.01) |
| *H01M 4/62* | (2006.01) |
| *H01M 4/525* | (2010.01) |

(Continued)

(52) U.S. Cl.
CPC ......... *H01M 4/505* (2013.01); *H01M 4/0471* (2013.01); *H01M 4/1391* (2013.01); *H01M 4/366* (2013.01); *H01M 4/525* (2013.01); *H01M 4/628* (2013.01); *H01M 10/052* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2016/0149210 A1* | 5/2016 | Yoo ................... | H01M 4/366 429/231.95 |
| 2020/0161650 A1* | 5/2020 | Park ................... | H01M 4/525 |
| 2021/0005874 A1* | 1/2021 | Park ................... | C01G 53/00 |

FOREIGN PATENT DOCUMENTS

| | | |
|---|---|---|
| CN | 107408686 A | 11/2017 |
| KR | 10-1964716 B1 | 4/2019 |

OTHER PUBLICATIONS

Office Action for the Chinese Patent Application No. 202010280690.6 issued by the Chinese Patent Office dated Jun. 30, 2023.

* cited by examiner

*Primary Examiner* — Jonathan Crepeau
(74) *Attorney, Agent, or Firm* — IP & T GROUP LLP

(57) ABSTRACT

A lithium secondary battery includes a cathode formed of a cathode active material including a lithium metal oxide particle having a concentration gradient, and a coating formed on the lithium metal oxide particle, the coating including aluminum, titanium and zirconium, an anode, and a separator interposed between the cathode and the anode. The cathode active material includes 2,000 ppm to 4,000 ppm of aluminum, 4,000 ppm to 9,000 ppm of titanium and 400 ppm to 700 ppm of zirconium, based on the total weight of the cathode active material. The performance of the secondary battery may be maintained under a high temperature condition.

15 Claims, 5 Drawing Sheets

(51) Int. Cl.
*H01M 4/1391* (2010.01)
*H01M 4/04* (2006.01)
*H01M 4/02* (2006.01)

LITHIUM SECONDARY BATTERY

CROSS-REFERENCE TO RELATED APPLICATION AND CLAIM OF PRIORITY

This application is a continuation of U.S. patent application Ser. No. 16/845,933 filed on Apr. 10, 2020, which claims priority to Korean Patent Applications No. 10-2019-0042856 filed on Apr. 12, 2019 in the Korean Intellectual Property Office (KIPO). The entire disclosure of each of the foregoing applications is incorporated herein by reference in its entirety.

BACKGROUND

1. Field

The present invention relates to a lithium secondary battery. More particularly, the present invention relates to lithium secondary battery including a lithium metal oxide-based cathode active material.

2. Description of the Related Art

A secondary battery which can be charged and discharged repeatedly has been widely employed as a power output source of a mobile electronic device such as a camcorder, a mobile phone, a laptop computer, etc., according to developments of information and display technologies. Recently, the secondary battery or a battery pack including the same is being developed and applied as an eco-friendly power output source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery, and high capacity, high output, and high lifespan characteristics are desired to the lithium secondary battery.

However, as the application range of the lithium secondary batter is expanded, securing stability in harsher environments such as high temperature or low temperature environments is demanded. For example, the lithium secondary battery or the cathode electrode active material needs to have thermal stability to prevent short circuiting, ignition, etc., when penetration occurs by an external object.

As an application of the lithium secondary battery has been expanded, demands of more improved life-span, capacity and operation stability are increased. In the lithium metal oxide used as the cathode active material, non-uniformity of a chemical structure due to lithium precipitation may be caused, and the lithium secondary battery having desired capacity and life-span may not be obtained. Further, a structure of the lithium metal oxide may be transformed or damaged when charging and discharging operations are repeated to degrade lifespan stability and capacity retention.

However, it is not easy for the cathode electrode active material to satisfy all of the above-described properties. For example, Korean Published Patent Application No. 10-2017-0093085 discloses a cathode electrode active material including a transition metal compound and an ion adsorption binder, but sufficient life characteristics and stability may not be ensured.

SUMMARY

According to an aspect of the present invention, there is provided a lithium secondary battery having improved reliability and a method of manufacturing the same.

According to exemplary embodiments of the present invention, a lithium secondary battery may include a cathode formed of a cathode active material including a lithium metal oxide particle having a concentration gradient, and a coating formed on the lithium metal oxide particle, the coating including aluminum, titanium and zirconium, an anode, and a separator interposed between the cathode and the anode. The cathode active material may include 2,000 ppm to 4,000 ppm of aluminum 4,000 ppm to 9,000 ppm of titanium and 400 ppm to 700 ppm zirconium, based on the total weight of the cathode active material.

In some embodiments, the coating may include a coating layer covering at least a portion of a surface of the lithium metal oxide particle, or a doping mingled inside the lithium metal oxide particle from a surface of the lithium metal oxide particle.

In some embodiments, the lithium metal oxide particle may include a core portion, a shell portion, and a concentration gradient region within at least a portion between the core portion and the shell portion. In some embodiments, the coating may further include boron.

In some embodiments, the boron may be included in 100 ppm to 500 ppm based on the total weight of the cathode active material.

In some embodiments, a ratio of the titanium to the aluminum in the cathode active material may be 1.7 to 2.7.

In some embodiments, a ratio of the aluminum to the zirconium in the cathode active material may be 4 to 8.

In some embodiments, the lithium metal oxide particle may have a secondary particle structure in which primary particles are aggregated.

In some embodiments, the primary particle may have a rod shape.

In some embodiments, the lithium metal oxide particle may include nickel and manganese, and a concentration of the nickel may continuously decrease and a concentration of the manganese may continuously increase, from a core portion to a shell portion.

In some embodiments, the lithium metal oxide particle may be represented by Chemical Formula 1 below.

$$Li_xNi_aM1_bM2_cO_y \quad \text{[Chemical Formula 1]}$$

In Chemical Formula 1 above, each of M1 and M2 may include at least one selected from a group consisting of Co, Mn, Na, Mg, Ca, Ti, V, Cr, Cu, Zn, Ge, Sr, Ag, Ba, Zr, Nb, Mo, Al, Ga and B, and $0<x\leq1.1$, $1.98\leq y\leq2.02$, $0.6\leq a\leq0.95$ and $0.05\leq b+c\leq0.4$.

In some embodiments, the lithium metal oxide particle may be represented by Chemical Formula 2 below.

$$Li_xNi_aCo_dMn_eM3_fO_y \quad \text{[Chemical Formula 2]}$$

In Chemical Formula 2 above, M3 may dude at least one selected from a group consisting of Na, Mg, Ca, Ti, V, Cr, Cu, Zn, Ge, Sr, Ag, Ba, Zr, Nb, Mo, Al, Ga and B, and $0<x\leq1.1$, $1.98\leq y\leq2.02$, $0.75\leq a\leq0.85$, $0.08\leq d\leq0.12$, $0.08\leq e\leq0.12$ and $0.15\leq d+e+f\leq0.25$.

In some embodiments, the cathode active material may include 2,000 ppm to 3,000 ppm of aluminum, 4,000 ppm to 6,000 ppm of titanium and 400 ppm to 500 ppm of zirconium, based on the total weight of the cathode active material.

In some embodiments, the lithium metal oxide particle may be represented by Chemical Formula 3 below.

$$Li_xNi_aCo_dMn_eM3_fO_y$$ [Chemical Formula 3]

In Chemical Formula 3 above, M3 may include at least one selected from a group consisting of Na, Mg, Ca, Ti, V, Cr, Cu Zn, Ge, Sr, Ag, Ba, Zr, Nb, Mo, Al, Ga and B, and $0<x\leq1.1$, $1.98\leq y\leq2.02$, $0.86\leq a\leq0.9$, $0.07\leq d\leq0.11$, $0.01\leq e\leq0.05$ and $0.1\leq d+e+f\leq0.14$.

In some embodiments, the cathode active material may include 2,500 ppm to 3,500 ppm of aluminum, 5,000 ppm to 9,000 ppm of titanium and 400 ppm to 700 ppm of zirconium, based on the total weight of the cathode active material. According to exemplary embodiments of the present invention, in a method of manufacturing a lithium secondary battery, a cathode active material in which a coating is formed on a surface of a lithium metal oxide particle may be prepared by heat treating the lithium metal oxide particle having a concentration gradient between a core portion and a surface and a coating source particle including an aluminum oxide particle, a titanium oxide particle and a zirconium oxide particle, together. A cathode is formed by applying the cathode active material onto a cathode current collector. An anode is formed to face the cathode with a separator interposed therebetween. The cathode active material may be formed to include 2,000 ppm to 4,000 ppm of aluminum, 4,000 ppm to 9,000 ppm of titanium and 400 ppm to 700 ppm of zirconium, based on the total weight of the cathode active material.

In some embodiments, the cathode active material in which the coating formed on a surface of the lithium metal oxide particle and a boron source may be further mixed and additionally heat treated.

In some embodiments, the cathode active material may be further washed before applying the cathode active material.

According to exemplary embodiments of the present invention, a cathode active material in which a coating including aluminum, titanium and zirconium is formed on a surface of a lithium metal oxide particle having a concentration gradient may be used. The cathode active material may include the aluminum, the titanium and the zirconium at 2,000 ppm to 4,000 ppm, 4,000 ppm to 9,000 ppm, and 400 ppm to 700 ppm, respectively, based on the total weight of the cathode active material, in the coating and the lithium metal oxide particle. So that, capacity and power output may be efficiently maintained whereafter a lithium secondary battery stand at high temperature.

According to exemplary embodiments, a ratio of the titanium to the aluminum in the cathode active material may be 1.7 to 2.7, so that a performance of a lithium secondary battery may be efficiently maintained.

According to exemplary embodiments, a lithium metal oxide particle may include a secondary particle in which primary particles are aggregated. The secondary particle may have a large specific surface area, so that aluminum and titanium may be efficiently coated and doped. Thus, a performance retention rate may be improved whereafter a lithium secondary battery stand at high temperature.

According to exemplary embodiments, in a method of manufacturing a lithium secondary battery, a cathode active material in which a coating is formed thereon may be used after washing, so that a retention rate of capacity and power output may be efficiently improved whereafter a lithium secondary battery stand at high temperature.

DETAILED DESCRIPTION OF THE EMBODIMENTS

According to exemplary embodiments of the present invention, a lithium secondary battery including a cathode including a cathode active material in which a coating including aluminum, titanium and zirconium as a predetermined amount is formed on a surface of a lithium metal oxide particle having a concentration gradient, an anode, and a separator is provided. And a method of manufacturing a lithium secondary battery is provided. The performance of the secondary battery may be maintained under a high temperature condition.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
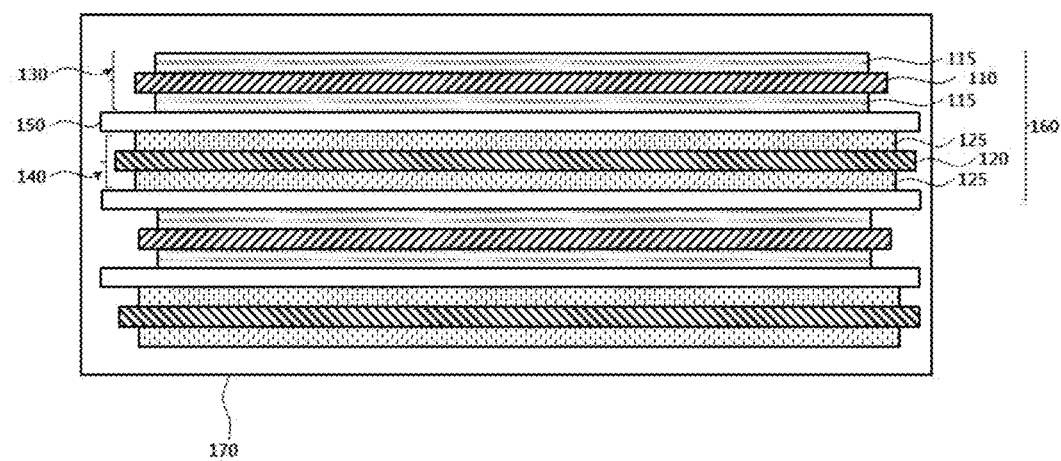
FIG. 1 is a schematic cross-sectional view illustrating a lithium secondary battery in accordance with exemplary embodiments.

FIG. 1 is a schematic cross-sectional view illustrating a lithium secondary battery in accordance with exemplary embodiments.

Referring to FIG. 1, a lithium secondary battery according to the present invention may include a cathode 130, an anode 140, and a separator 150 interposed between the cathode 130 and the anode 140.

The cathode 130 may include a cathode current collector 110 and a cathode active material layer 115 formed by applying a cathode slurry onto the cathode current collector 110. According to exemplary embodiments, the cathode slurry may include a cathode active material in which a coating is formed on a surface of a lithium metal oxide particle.

The lithium metal oxide particle may include a core portion and a shell portion. Compositions of the core portion and the shell portion may be different to each other. In some embodiments, the core portion may indicate a central portion of the lithium metal oxide particle. The term "central portion" may include an exact central point of an active material particle, and may further include a region within a predetermined radius from the exact central point. For example, "central portion" may encompass a region within a radius of about 0.1 μm from the exact central point.

The shell portion may indicate a region embracing a predetermined thickness from a surface of the lithium metal oxide particle. For example, the shell portion may encompass a region within a thickness about 0.1 μm from an outermost surface of the particle.

In some embodiments, each of the core portion and the shell portion may have a substantially constant composition.

The term "substantially constant" used herein may include a compositional change of substantially insignificant level. For example, it may include a change in composition of ±5% for a specific composition. For example, each of the core portion and the shell portion may include lithium metal oxides in which a composition ratio of each element contained therein is substantially constant.

In some embodiments, a concentration gradient region may be formed in a region between the core portion and the shell portion. The concentration gradient region may indicate a region in which at least one element among elements in a lithium metal oxide except for lithium and oxygen has continuous concentration gradient.

The term "continuous concentration gradient" used herein may indicate a concentration profile which may be changed with a uniform trend or tendency. The uniform trend may include an increasing trend or a decreasing trend.

In some embodiments, the continuous concentration gradient may include a linear concentration profile or a curved concentration profile according to a region of a particle. In the curved concentration profile, the concentration may change in a uniform trend without any inflection point.

In some embodiments, the lithium metal oxide particle may include a concentration gradient region formed though an entire section from the central portion to the surface.

In some embodiments, concentrations of lithium and oxygen may be substantially constant throughout an entire region of a particle.

In some embodiments, a concentration of at least one metal other than lithium in the concentration gradient region may continuously increase, and a concentration of at least one metal may continuously decrease.

In some embodiments, a concentration of at least one metal other than lithium in the concentration gradient region may have a substantially constant concentration from a central portion to a surface.

According to exemplary embodiments, the lithium metal oxide particle may include nickel, and the nickel may have a continuous concentration gradient throughout the concentration gradient region. In some embodiments, a concentration (or molar ratio) of nickel may decrease continuously in the concentration gradient region along a direction from the core portion to the shell portion.

In some embodiments, metals other than lithium in the lithium metal oxide particle may include a first metal and a second metal. A concentration of the first metal may be continuously decreased from the core portion to the shell portion in the concentration gradient region. A concentration of the second metal may be continuously increased from the core portion to the shell portion.

In some embodiments, the second metal may include manganese.

In some embodiments, metals other than lithium included in the lithium metal oxide particle may further include a third metal. The third metal may have a substantially constant concentration in the concentration gradient region. In some embodiments, the third metal may have a substantially constant concentration in the entire region of the lithium metal oxide particle.

In some embodiments, the third metal may include cobalt.

The term "concentration" used herein may indicate a molar ratio of each element included in the lithium metal oxide, for example, it may indicate a mutual molar ratio of the first metal, the second metal, and the third metal.

For example, the lithium metal oxide particle may be represented by Chemical Formula 1 below.

  [Chemical Formula 1]

In Chemical Formula 1 above, each of M1 and M2 may include at least one selected from a group consisting of Co, Mn, Na, Mg, Ca, Ti, V, Cr, Cu, Zn, Ge, Sr, Ag, Ba, Zr, Nb, Mo, Al, Ga and B, and $0<x\leq1.1$, $1.98\leq y\leq2.02$, $0.6\leq a\leq0.95$ and $0.05\leq b+c\leq0.4$.

In some embodiments, M1 and M2 in Chemical Formula 1 may be manganese (Mn) and cobalt (Co), respectively.

For example, nickel may serve as a metal related to a capacity of the lithium secondary battery. As an amount of nickel becomes higher, capacity and power of the lithium secondary battery may be improved. However, an excessive amount of nickel may degrade of a life-span property of the battery, and may be disadvantageous in an aspect of mechanical and electrical stability of the battery. For example, when the amount of nickel is excessively increased, defects such as ignition or short-circuit by a penetration of an external object may not be sufficiently suppressed.

However, according to exemplary embodiments, nickel may be included as the first metal. Thus, the amount of nickel at the central portion may be relatively high to improve the capacity and power output of the lithium secondary battery, and a concentration of nickel may be decreased from the central portion to the surface to reduce instability about penetration and a life-span degradation.

For example, manganese (Mn) may serve as a metal related to the mechanical and electrical stability of the lithium secondary battery. In exemplary embodiments, an amount of Mn may be increased from the central portion to the surface so that the defects from the penetration such as ignition or short-circuit through the surface may be suppressed or reduced, and the life-span of the lithium secondary battery may be also enhanced.

For example, cobalt (Co) may serve as a metal related to a conductivity or a resistance of the lithium secondary battery. In exemplary embodiments, a concentration of cobalt may be fixed or uniformly maintained through an entire region of the cathode active material particle. Thus, a current or a charge flow through the cathode active material particle may be uniformly maintained while improving the conductivity of the battery and maintaining low resistance.

In some embodiments, in Chemical Formula 1, a concentration (or a molar ratio) of nickel may be continuously decreased from about 0.95 to about 0.6.

If a lower limit of the nickel concentration (e.g., a surface concentration) is less than about 0.6, capacity and power output at the surface of the first cathode active material particle may be excessively deteriorated. If an upper limit of the nickel concentration (e.g., a central concentration) exceeds about 0.95, life-span and mechanical stability at the central portion may be excessively degraded.

In some embodiments, the cathode active material particle may further include a coating on the surface thereof. The coating may be provided as a coating layer at least partially covering a surface of the lithium metal oxide particle.

The coating may include aluminum (Al), titanium (Ti) and zirconium (Zr). The coating may further include boron (B), barium (Ba), silicon (Si), magnesium (Mg) or phosphorous (P). And, the coating may further include an alloy thereof or an oxide thereof. The elements, alloy and oxide may be used alone or in a mixture thereof. The cathode active material particle may be passivated by the coating layer so that penetration stability and life-span of the battery may be further improved.

In an embodiment, the elements, the alloy or the oxide of the coating layer may be inserted in the cathode active material particle as dopants. For example, the elements, the alloy or the oxide may be diffused or dispersed into the lithium metal oxide particle when forming the coating.

In some embodiments, the aluminum may be included at 2,000 ppm to 4,000 ppm based on the total weight of the cathode active material in the cathode active material, and the titanium may be included 4,000 ppm to 9,000 ppm based on the total weight of the cathode active material in the cathode active material.

When the coating contains the aluminum and the titanium and the overall cathode active material includes the aluminum and the titanium in the above-described content, chemical stability may be increased. For example, a stable structure can be maintained even after standing for a long time under a high temperature condition. And, a structure of the particle may be effectively protected under the high temperature condition. Therefore, performance deterioration of the lithium secondary battery under the high temperature condition may be prevented. More preferably, the titanium may be included in 4,000 ppm to 9,000 ppm based on the total weight of the cathode active material.

In exemplary embodiments, the titanium content may be 1.7 to 2.7 times the aluminum content. When the cathode active material includes titanium and aluminum in the above-described content ratio, chemical stability under a high temperature condition may be further improved. Therefore, performance deterioration after leaving the lithium secondary battery at high temperature may be reduced.

In some embodiments, as nickel content of the lithium metal oxide particle increases, the content of titanium compared to aluminum in the cathode active material may increase. For example, when the nickel content increases, a heat treatment temperature of the lithium metal oxide particle decreases, and a surface area may increase. Therefore, the titanium content may be increased compared to the aluminum for effectively protecting the lithium metal oxide particle.

In some embodiments, the zirconium may be included at 400 ppm to 700 ppm based on the total weight of the cathode active material. In the above-mentioned content range of zirconium, a structure of the cathode active material can be chemically stabilized at high temperature, and the lithium metal oxide particle may be effectively protected. Therefore, performance degradation under a high temperature condition of the lithium secondary battery can be further suppressed.

In exemplary embodiments, a content of aluminum compared to a content of zirconium in the cathode active material may be 4 to 8 times. When the aluminum content compared to the zirconium content is within the above range, chemical stability under a high temperature condition may be improved. Therefore, performance deterioration after leaving the lithium secondary battery at a high temperature may be reduced. Preferably, the aluminum content compared to the zirconium content may be 5 to 6 times.

In some embodiment, boron may be included in the coating and the lithium metal oxide particle. Boron may reduce a melting point of the coating. Further, fluidity of a fluid in which the coating is at least partially melted may be improved. Thus, the coating may coat the lithium metal oxide particle more effectively and uniformly. Therefore, the coating may effectively protect the lithium metal oxide particle.

In some embodiments, the cathode active material may be used after washing. The washing may include cleaning the cathode active material with deionized water. A lithium impurity on a surface of the cathode active material may be removed by the washing. Therefore, power output characteristic of the battery may be improved. For example, a side reaction occurring on the surface of the cathode active material may be effectively suppressed by removing the lithium impurity. Therefore, a chemical deterioration of the coating and the lithium metal oxide particle under a high temperature condition may be suppressed.

In some embodiments, the lithium metal oxide particle may have a secondary particle structure in which primary particles are aggregated. For example, the primary particles may have a rod-shape. A specific surface area of the secondary particle formed by gathering the rod-shaped primary particles may increase. The coating may be more effectively coated on a surface of the secondary particle. Therefore, a physically and chemically more stable coating may be formed on the surface of the secondary particle, so that deterioration of the lithium metal oxide under a high temperature condition can be effectively prevented.

In some embodiments, an average diameter of the cathode active material particle may be in a range from about 3 μm to about 20 μm.

In some embodiments, the lithium metal oxide particle may be represented by Chemical Formula 2 below.

   [Chemical Formula 2]

In Chemical Formula 2 above, M3 may include at least one selected from a group consisting of Na, Mg, Ca, Ti, V, Cr, Cu, Zn, Ge, Sr, Ag, Ba, Zr, Nb, Mo, Al, Ga and B, and $0<x\leq1.1$, $1.98\leq y\leq2.02$, $0.75\leq a\leq0.85$, $0.08\leq d\leq0.12$, $0.08\leq e\leq0.12$ and $0.15\leq d+e+f\leq0.25$.

In Chemical Formula 2, M3 may not be included. For example, f may be 0.

In some embodiment, in consideration of a power output characteristic, lifespan and penetration stability of the lithium secondary battery, a, b and c may be $0.77\leq a\leq0.83$, $0.07\leq b\leq0.13$ and $0.07\leq c\leq0.13$ in Chemical Formula 2. For example, a concentration or molar ratio of nickel (Ni) may be continuously decreased from about 0.83 to about 0.77 along a direction from the core portion to the shell portion in the concentration gradient region. A concentration or molar ratio of manganese (Mn) may be continuously increased from about 0.07 to about 0.13 from the core portion to the shell portion in the concentration gradient region. The concentration of cobalt (Co) can be fixed from a center to a surface at a specific molar ratio between 0.07 and 0.13.

In one embodiment, $0.79\leq a\leq0.81$, $0.09\leq b\leq0.11$ and $0.09\leq c\leq0.11$.

In some embodiments, a coating may be formed on a surface of the lithium metal oxide particle represented by Chemical Formula 2 above. The coating and the lithium metal oxide particle as a whole may include aluminum in an amount of 2,000 ppm to 3,000 ppm with respect to the total weight of the cathode active material, and titanium in an amount of 4,000 ppm to 6,000 ppm with respect to the total weight of the cathode active material.

When the content of aluminum and titanium exceeds the above-described range, a high temperature deterioration suppression property for the lithium metal oxide particle may be reduced. For example, when the content is less than the above-described range, stability at a high temperature of the coating and the lithium metal oxide particle may be reduced. When the content exceeds the above-described range, aluminum and titanium may remain on the surface unevenly, thereby reducing a performance of the battery.

In some embodiments, a ratio of the titanium to the aluminum in the cathode active material may be 1.5 to 2.2. In this case, chemical stability under a high temperature condition may be further improved. Therefore, performance deterioration after leaving the lithium secondary battery at high temperature may be reduced.

In some embodiments, zirconium may be included at 400 ppm to 500 ppm based on the total weight of the cathode active material. When the content of zirconium exceeds the above-described range, the chemical stability of the coating and the lithium metal oxide particle may be reduced.

  [Chemical Formula 3]

In Chemical Formula 3 above, M3 may include at least one selected from a group consisting of Na, Mg, Ca, Ti, V, Cr, Cu, Zn, Ge, Sr, Ag, Ba, Zr, Nb, Mo, Al, Ga and B, and $0<x\leq1.1$, $1.98\leq y\leq2.02$, $0.86\leq a\leq0.9$, $0.07\leq d\leq0.11$, $0.01\leq e\leq0.05$ and $0.1\leq d+e+f\leq0.14$.

In Chemical Formula 3, M3 may not be included. For example, f may be 0.

In some embodiment, in consideration of a power output characteristic, lifespan and penetration stability of the lithium secondary battery, a, d and e may be $0.86\leq a\leq0.9$, $0.07\leq d\leq0.13$ and $0.01\leq e\leq0.05$ in Chemical Formula 3. For example, a concentration or molar ratio of nickel (Ni) may be continuously decreased from about 0.9 to about 0.86 along a direction from the core portion to the shell portion in the concentration gradient region. A concentration or molar ratio of manganese (Mn) may be continuously increased from about 0.01 to about 0.05 from the core portion to the shell portion in the concentration gradient region. The concentration of cobalt (Co) can be fixed from a center to a surface at a specific molar ratio between 0.07 and 0.11.

In one embodiment, $0.87\leq a\leq0.89$, $0.08\leq d\leq0.1$ and $0.02\leq e\leq0.04$.

In some embodiments, a coating may be formed on a surface of the lithium metal oxide particle represented by Chemical Formula 3 above. Aluminum in an amount of 2,500 ppm to 3,500 ppm with respect to the total weight of the cathode active material, and titanium in an amount of 5,000 ppm to 9,000 ppm with respect to the total weight of the cathode active material may be included in the cathode active material including the coating and the lithium metal oxide particle represented by Chemical Formula 3 above.

When the content of aluminum and titanium exceeds the above-described range, a high temperature deterioration suppression property for the lithium metal oxide particle may be reduced. For example, when the content is less than the above-described range, stability at a high temperature of the coating and the lithium metal oxide particle may be reduced. When the content exceeds the above-described range, aluminum and titanium may remain on the surface unevenly, thereby reducing a performance of the battery.

In some embodiments, a ratio of the titanium to the aluminum in the coating may be 2.3 to 3. In this case, chemical stability under a high temperature condition be further improved. Therefore, performance deterioration after leaving the lithium secondary battery at high temperature may be reduced.

In some embodiments, zirconium pray be included at 400 ppm to 700 ppm based on the total eight of the cathode active material. When the content of zirconium exceeds the above-described range, the chemical stability of the coating and the lithium metal oxide particle may be reduced.

As described above, the content of aluminum, titanium and zirconium in the coating formed on the surface of the lithium metal oxide particle represented by Chemical Formula 2 and the coating formed on the surface of the lithium metal oxide particle represented by Chemical Formula 3 may be different from each other. For example, when the concentration of nickel, cobalt, or manganese in the surface portion (shell portion) of the lithium metal oxide particles is different, compositions of coating and doping may be adjusted according to the concentration of the nickel, cobalt, or manganese, thereby controlling the battery under a high temperature condition of the coating. Thus, a performance degradation suppression characteristic may be improved.

In a formation of the lithium metal oxide particle, metal precursor solutions having different concentrations may be prepared. The metal precursor solutions may include precursors of metals that may be included in the cathode active material. For example, the metal precursors may include halides, hydroxides, acid salts, etc., of the metals.

For example, the metal precursors may include a lithium precursor (e.g., a lithium oxide), a nickel precursor, a manganese precursor and a cobalt precursor.

In some embodiments, a first precursor solution having a target composition at the central portion (e.g., concentrations of nickel, manganese and cobalt at the central portion) and a second precursor solution having a target composition at the surface or the shell portion (e.g., concentrations of nickel, manganese and cobalt at the surface) may be each prepared.

Subsequently, the first and second precursor solution may be mixed and a precipitate may be formed by a co-precipitation method. In some embodiments, a mixing ratio may be continuously changed so that a continuous concentration gradient may be formed from the target composition at the central portion to the target composition at the surface. Accordingly, the precipitate may include a concentration gradient of the metals therein.

In some embodiments, a chelate agent and a basic agent (e.g., an alkaline agent) may be added while forming the precipitate. In some embodiments, the precipitate may be thermally treated, and then a lithium salt may be mixed and thermally treated again.

According to exemplary embodiments, a cathode active material may be manufactured by forming a coating on a surface of the lithium metal oxide particle. At least a part of the coating material may be diffused and doped into the lithium metal oxide particle. The coating may be formed by mixing the lithium metal oxide particle and a coating source particle and stirring the mixture while heating. As the coating source particle, for example, a alumina ($Al_2O_3$) particle may be added to form a coating containing aluminum. Further, for example, a titanium dioxide ($TiO_2$) particle may be added to form a coating containing titanium. In addition, zirconium oxide ($ZrO_2$) may be used for zirconium, and boric acid ($H_3BO_3$) may be used for boron.

In some embodiments, an aluminum source, a titanium source, and/or a zirconium source may be mixed with the lithium metal oxide particle and then heat-treated at 600 to 800° C. (first heat treating). Accordingly, a cathode active material in which aluminum, titanium, or zirconium is included in the coating and the lithium metal oxide particle may be manufactured.

In some embodiments, the first heat-treated material may be mixed with a boron source and then heat-treated at 250 to 400° C. (second heat treatment). In this case, boron may be included in the coating and the lithium metal oxide particle.

In some embodiments, the cathode active material may be used after water (deionized water) washing. The washing may remove lithium impurities on a surface of the cathode active material. The water may be, for example, de-ionized water having a specific resistance of 25 MΩcm or less.

In exemplary embodiments, the cathode active material may be mixed and stirred together with a binder, a conductive additive and/or a dispersive additive in a solvent to form a cathode slurry. The cathode slurry may be coated on the cathode current collector 110, and pressed and dried to obtain the cathode 130.

The cathode current collector 110 may include stainless-steel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115, and an amount of the cathode active material particle may be relatively increased. Thus, capacity and power output of the lithium secondary battery may be further improved.

The conductive additive may be added to facilitate an electron mobility between the active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In some embodiments, the density of the cathode 130 may be about 3.0 to about 3.9 g/cc, and preferably about 3.2 to about 3.8 g/cc.

In exemplary embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), ETC. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

When graphite is used as the anode active material, for example, the graphite may have an average particle diameter of 5 to 30 μm.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersive additive in a solvent to form an anode slurry. The anode slurry may be coated on the anode current collector 120, and pressed and dried to obtain the anode 140.

As the binder and the conductive additive of the anode slurry, materials substantially same or similar to those described above with respect to the cathode slurry may be used. In some embodiments, the binder for the anode 140 may include an aqueous binder such as such as styrene-butadiene rubber (SBR) that may be used with a thickener such as carboxymethyl cellulose (CMC) so that compatibility with the carbon-based active material may be improved.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may be also formed from a non-woven fabric including a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by, e.g., precipitation or sedimentation. Therefore, the enhancement of power output and stability may be effectively implemented.

In example embodiments, an electrode cell 160 may be defined by the cathode 130, the anode 140 and the separator 150, and a plurality of the electrode cells 160 may be stacked to form an electrode assembly having, e.g., a jelly roll shape. For example, the electrode assembly may be formed by winding, laminating or folding of the separation layer 150.

The electrode assembly may be accommodated in an outer case 170 together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by $Li^+X^-$; and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the outer case 170. The electrode tabs may be welded together with the one end of the outer case 170 to form an electrode lead exposed at an outside of the outer case 170.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related at will obviously understand that various alterations and modifications are possible within the scope and spirit of the present invention. Such alterations and modifications are duly included in the appended claims.

Examples and Comparative Examples: Preparation of Secondary Battery

Lithium secondary batteries of Examples and Comparative Examples were prepared according to the following method.

1. Cathode Active Material (1) Preparation of Lithium Metal Oxide Particle

A lithium metal oxide particle (hereinafter referred to as NCM811) having a constant composition from the central portion to the surface of $LiNi_{0.8}Co_{0.1}Mn_{0.1}O_2$ was prepared.

While mixing a metal salt aqueous solution for forming a central portion and a metal salt aqueous solution for forming a surface portion, a chelating agent and a basic aqueous solution were added to a reactor to manufacture a metal element doped precipitate having a concentration gradient of at least one of metal elements included therein between the central portion and the surface portion. The precipitate was heat treated, thereafter mixed with a lithium salt and heat treated again.

After the heat treatment, a lithium metal oxide particle (hereinafter, CAM1) which had an overall composition of $LiNi_{0.8}Co_{0.1}Mn_{0.10}O_2$, a composition of a core portion of $LiNi_{0.83}Co_{0.1}Mn_{0.07}O_2$, a composition of a shell portion of $LiNi_{0.78}Co_{0.1}Mn_{0.12}O_2$, and a concentration gradient of nickel and manganese in a region between the core portion and the shell portion.

Figure 2:
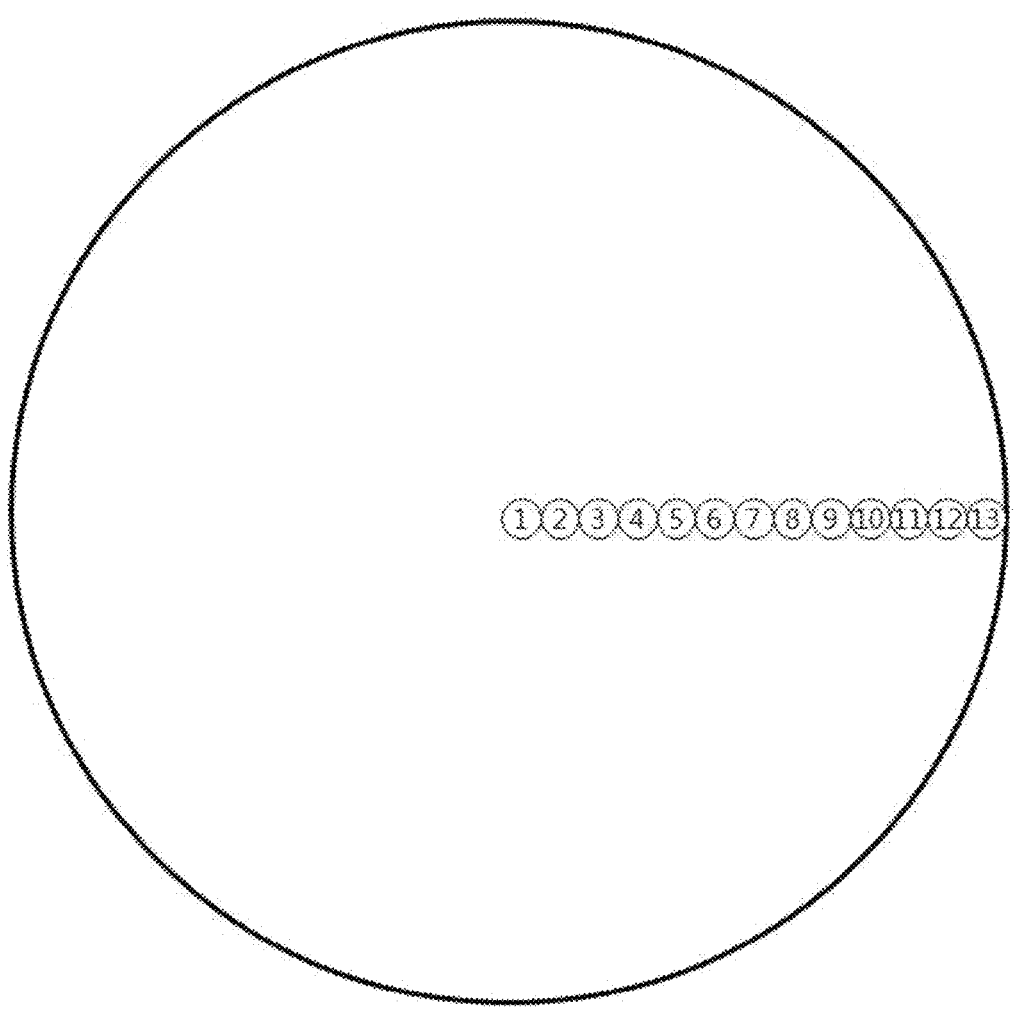
FIG. 2 is a schematic cross-sectional view illustrating a position measuring a concentration gradient of lithium metal oxide particle manufactured in accordance with exemplary embodiments.

FIG. 2 is a schematic cross-sectional view illustrating a position measuring a concentration gradient of lithium metal oxide particle (for example, CAM1) manufactured in accordance with exemplary embodiments. Referring to FIG. 2, for lithium metal oxide particle having a distance of 4.8 μm from the center to the surface of the particle, concentrations were measured at intervals of 0.4 μm from the center to the surface (positions 1 to 13). The result was shown in Table 1 below.

TABLE 1

| position | Ni | Co | Mn |
|---|---|---|---|
| 1 | 0.830 | 0.100 | 0.070 |
| 2 | 0.831 | 0.101 | 0.068 |
| 3 | 0.829 | 0.100 | 0.071 |
| 4 | 0.830 | 0.100 | 0.070 |
| 5 | 0.800 | 0.099 | 0.101 |
| 6 | 0.780 | 0.100 | 0.120 |
| 7 | 0.780 | 0.100 | 0.120 |
| 8 | 0.780 | 0.101 | 0.119 |
| 9 | 0.781 | 0.100 | 0.119 |
| 10 | 0.779 | 0.101 | 0.120 |
| 11 | 0.780 | 0.100 | 0.120 |
| 12 | 0.781 | 0.099 | 0.120 |
| 13 | 0.780 | 0.100 | 0.120 |

In a similar manner to CAM1, a lithium metal oxide particle (hereinafter CAM2) which had a total composition was $LiNi_{0.88}Co_{0.09}Mn_{0.03}O_2$, and a concentration gradient of nickel and manganese in the region between the core portion and the shell portion were prepared.

(2) Formation of Coating

Coatings were formed on the surfaces of the lithium metal oxide particles (NCM811, CAM1 and CAM2).

$Al_2O_3$ was used as an aluminum source, $TiO_2$ was used as a titanium source, $ZrO_2$ was used as a zirconium source, and $H_3BO_3$ was used as the boron source.

The lithium metal oxide particles and the aluminum source, the titanium source and/or the zirconium source were mixed and primarily heat-treated at about 700° C. The primarily heat-treated materials were mixed with the boron source and stirred while heating to a temperature of about 300° C. By controlling the amount of the source materials, cathode active materials in which aluminum, titanium, zirconium and/or boron were included in the contents of Table 2 below with respect to the total weight of the cathode active material were prepared.

(3) Washing

De-ionized water having a specific resistance of less than 25 MΩcm was used. 1 kg of water was placed in a 2 L reactor and bubbled with nitrogen for 30 minutes to sufficiently remove dissolved oxygen inside the water, and then stirred at 300 rpm for 30 minutes under a nitrogen atmosphere with the cathode active material. It was filtered under reduced pressure using a Buchner funnel and the filtered cathode active material was dried under vacuum at 250° C. for 24 hours. It was fractionated by 325 mesh sieve to obtain a washed cathode active material.

In Table 2, the washed cathode active material was indicated by ○.

2. Cathode

Denka Black was used as a conductive additive, and PVDF was used as a binder. The cathode active material, the conductive additive and the binder were mixed by a weight ratio of 92:5:3 to form a cathode electrode slurry. The cathode electrode slurry was coated, dried, and pressed on an aluminum substrate to form a cathode. A density of the cathode after the pressing was 3.3 g/cc.

3. Anode

An anode slurry was prepared by mixing 93 wt % of a natural graphite as an anode active material, 5 wt % of a flake type conductive additive KS6, 1 wt % of SBR as a binder, and 1 wt % of CMC as a thickener. The anode slurry was coated, dried, and pressed on a copper substrate to form an anode.

4. Lithium Secondary Battery

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propenesultone (PRS), and 0.5 wt % of lithium bis(oxalato)borate (LiBOB) were added.

The lithium secondary battery as fabricated above was pre-charged by applying a pre-charging current (2.5 A) corresponding to 0.25 C for 36 minutes. After 1 hour, the battery was degased, aged for more than 24 hours, and then a formation charging-discharging (charging condition of CC-CV 0.2 C 4.2 V 0.05 C CUT-OFF, discharging condition CC 0.2 C 2.5 V CUT-OFF) was performed. Then, a standard charging-discharging (charging condition of CC-CV 0.5 C 4.2 V 0.05 C CUT-OFF, discharging condition CC 0.5 C 2.5 V CUT-OFF) was performed.

Experimental Example

1. SEM (Scanning Electron Microscopy) Analysis

Figure 3:
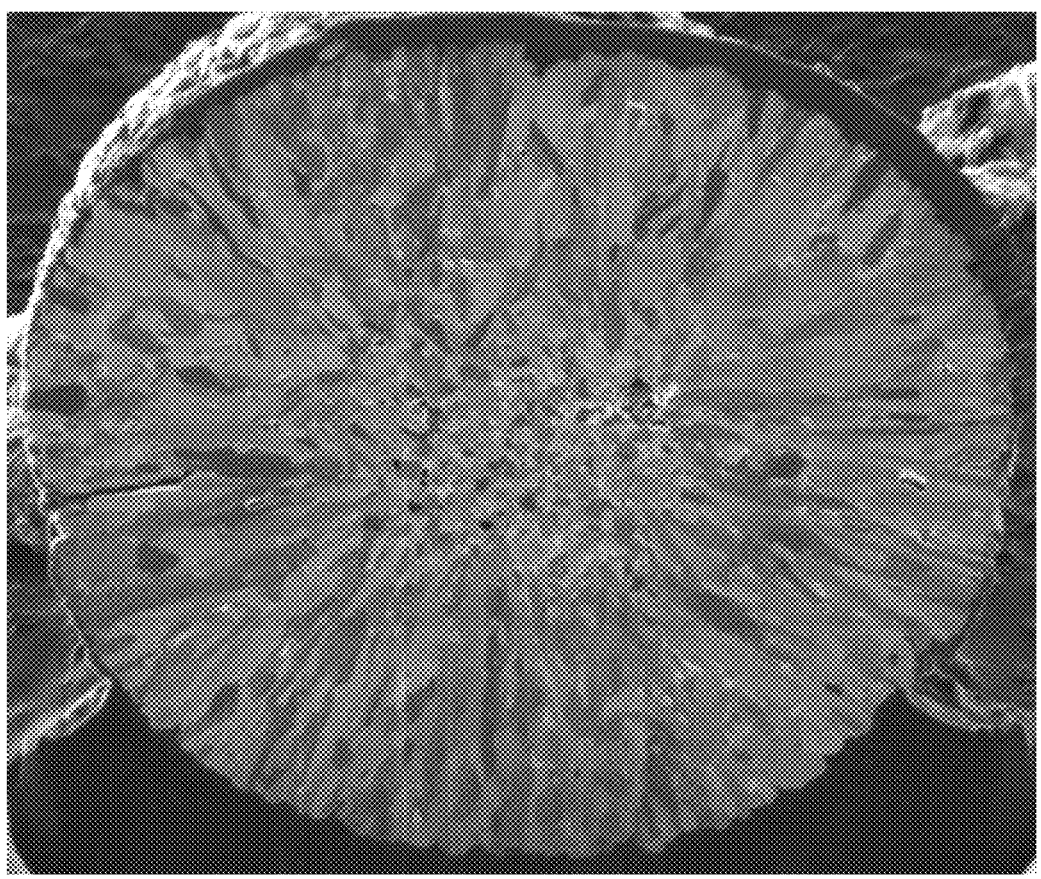
FIG. 3 and FIG. 4 are cross-sectional SEM (Scanning Electron Microscope) images of a lithium metal oxide particle according to Examples.
Figure 4:
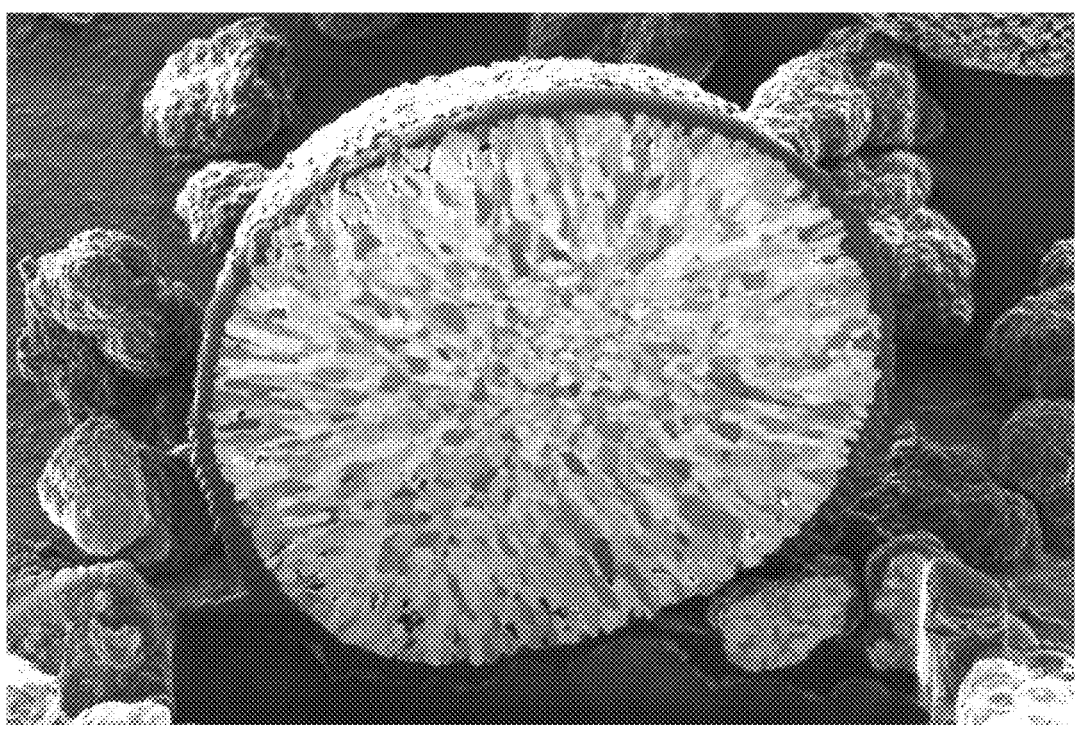
Figure 5:
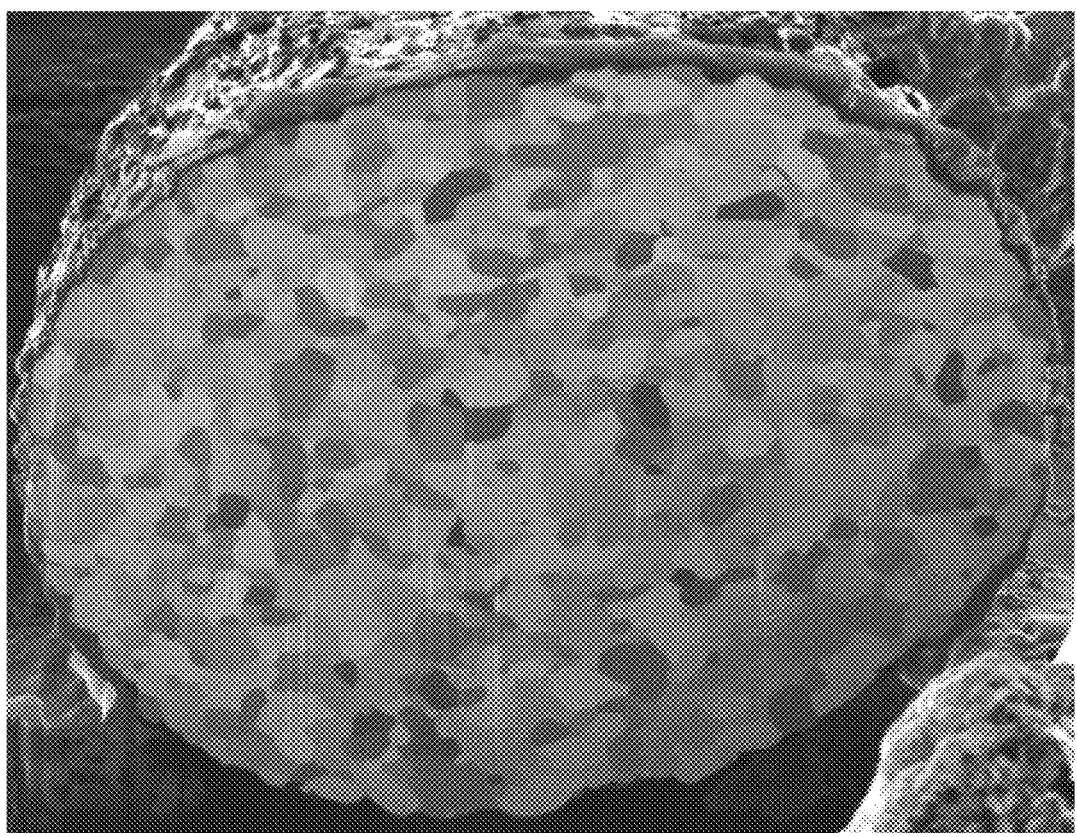
FIG. 5 is a cross-sectional SEM image of a lithium metal oxide particle according to Comparative Example.

The cross-sections of NCM811, CAM1 and CAM2 were analyzed by SEM to obtain images of FIGS. 3 to 5.

FIG. 3 is cross-sectional SEM image of a lithium metal oxide particle (CAM1) according to Examples.

FIG. 4 is cross-sectional SEM image of a lithium metal oxide particle (CAM2) according to Examples.

FIG. 5 is cross-sectional SEM image of a lithium metal oxide particle (NCM811) according to Comparative Examples.

Referring to FIGS. 3 to 5, it can be seen that the lithium metal oxide particles of Examples were formed by agglomeration of primary particles having a rod shape. Therefore, specific surface areas of the lithium metal oxide particles were increased.

2. Evaluation on Discharge Capacity Retention Rate After High Temperature Storage The batteries of Examples and Comparative Examples were charged to a state of charge (SOC) 95 at room temperature (25° C.). The charged cell left at 60° C. for 16 weeks. Then the discharge capacity was measured, and the retention rate of discharge capacity compared to the discharge capacity at 25° C. before leaving at the high temperature was shown in Table 2 below.

3. Evaluation on Discharge Power Output Retention Rate After High Temperature Storage The discharge power output was measured, and the retention rate of discharge power output compared to the discharge power output at 25° C. before leaving at the high temperature was shown in Table 2 below.

TABLE 2

| | Lithium metal oxide particle | Amount in cathode active material(ppm; based on the total weight of the cathode active material) | | | | Washing | Capacity retention rate(%; @60° C., 16 weeks) | Power output retention rate(%; @60° C., 16 weeks) |
| --- | --- | --- | --- | --- | --- | --- | --- | --- |
| | | Al | Ti | Zr | B | | | |
| Example1 | CAM1 | 2000 | 4000 | 400 | | | 87.2 | 91.9 |
| Example2 | CAM1 | 2500 | 5000 | 450 | | | 91.1 | 95.8 |
| Example3 | CAM1 | 3000 | 6000 | 500 | | | 90.2 | 94.9 |
| Example4 | CAM1 | 2500 | 5000 | 450 | 200 | | 91.8 | 96.8 |
| Example5 | CAM1 | 3000 | 6000 | 500 | 400 | | 91.1 | 96.2 |
| Example6 | CAM1 | 4000 | 7000 | 550 | | | 83.5 | 86.7 |
| Example7 | CAM1 | 2000 | 4000 | 400 | | o | 90.9 | 95.9 |
| Example8 | CAM1 | 2500 | 5000 | 450 | | o | 94.7 | 99.5 |
| Example9 | CAM1 | 3000 | 6000 | 500 | | o | 93.3 | 98.3 |
| Example10 | CAM1 | 2500 | 5000 | 450 | 200 | o | 95.3 | 99.6 |
| Example11 | CAM1 | 3000 | 6000 | 500 | 400 | o | 94.4 | 98.9 |
| Example12 | CAM1 | 4000 | 7000 | 550 | | o | 86.4 | 89.1 |
| Example13 | CAM2 | 2000 | 5000 | 400 | | | 85.1 | 91.6 |
| Example14 | CAM2 | 2500 | 6500 | 500 | | | 88.4 | 93.7 |
| Example15 | CAM2 | 2000 | 5000 | 400 | 200 | | 86.3 | 92.2 |
| Example16 | CAM2 | 2500 | 6500 | 500 | 400 | | 89.0 | 94.1 |
| Example17 | CAM2 | 3000 | 8000 | 600 | | | 89.2 | 92.5 |
| Example18 | CAM2 | 3500 | 9000 | 700 | | | 82.3 | 84.3 |
| Example19 | CAM2 | 2000 | 5000 | 400 | | o | 89.6 | 95.5 |
| Example20 | CAM2 | 2500 | 6500 | 500 | | o | 93.0 | 98.0 |
| Example21 | CAM2 | 2000 | 5000 | 400 | 200 | o | 90.2 | 96.3 |
| Example22 | CAM2 | 2500 | 6500 | 500 | 400 | o | 93.5 | 98.6 |
| Example23 | CAM2 | 3000 | 8000 | 600 | | o | 93.9 | 97.4 |
| Example24 | CAM2 | 3500 | 9000 | 700 | | o | 85.1 | 87.4 |
| Comparative Example1 | NCM811 | | | | | | 53.8 | 56.1 |
| Comparative Example2 | NCM811 | | | | | o | 56.7 | 58.9 |
| Comparative Example3 | NCM811 | | 500 | | | | 63.9 | 59.3 |
| Comparative Example4 | NCM811 | | 1000 | | | | 67.1 | 64.2 |
| Comparative Example5 | NCM811 | | 2000 | | | | 74.2 | 67.9 |
| Comparative Example6 | NCM811 | | 4000 | | | | 77.7 | 76.3 |
| Comparative Example7 | NCM811 | | 6000 | | | | 78.2 | 77.1 |
| Comparative Example8 | NCM811 | | 7000 | | | | 71.4 | 68.9 |
| Comparative Example9 | NCM811 | | 500 | | | o | 67.0 | 62.0 |
| Comparative Example10 | NCM811 | | 1000 | | | o | 70.3 | 67.5 |
| Comparative Example11 | NCM811 | | 2000 | | | o | 77.8 | 71.6 |
| Comparative Example12 | NCM811 | | 4000 | | | o | 82.1 | 80.1 |
| Comparative Example13 | NCM811 | | 6000 | | | o | 82.2 | 81.1 |

TABLE 2-continued

| | Lithium metal oxide particle | Amount in cathode active material (ppm; based on the total weight of the cathode active material) | | | | Washing | Capacity retention rate(%; @60° C., 16 weeks) | Power output retention rate(%; @60° C., 16 weeks) |
|---|---|---|---|---|---|---|---|---|
| | | Al | Ti | Zr | B | | | |
| Comparative Example14 | NCM811 | 7000 | | | | ○ | 75.1 | 73.3 |
| Comparative Example15 | CAM1 | | | | | | 54.5 | 54.7 |
| Comparative Example16 | CAM1 | | | | | ○ | 57.7 | 57.5 |
| Comparative Example17 | CAM1 | 500 | | | | | 70.8 | 66.9 |
| Comparative Example18 | CAM1 | 1000 | | | | | 75.1 | 79.3 |
| Comparative Example19 | CAM1 | 2000 | | | | | 79.3 | 82.4 |
| Comparative Example20 | CAM1 | 4000 | | | | | 84.2 | 84.8 |
| Comparative Example21 | CAM1 | 6000 | | | | | 84.8 | 86.2 |
| Comparative Example22 | CAM1 | 7000 | | | | | 78.8 | 79.0 |
| Comparative Example23 | CAM1 | 500 | | | | ○ | 74.4 | 70.5 |
| Comparative Example24 | CAM1 | 1000 | | | | ○ | 78.7 | 82.7 |
| Comparative Example25 | CAM1 | 2000 | | | | ○ | 83.0 | 86.1 |
| Comparative Example26 | CAM1 | 4000 | | | | ○ | 86.7 | 89.3 |
| Comparative Example27 | CAM1 | 6000 | | | | ○ | 86.8 | 89.1 |
| Comparative Example28 | CAM1 | 7000 | | | | ○ | 83.2 | 83.7 |
| Comparative Example29 | CAM1 | | 200 | | | | 59.3 | 59.0 |
| Comparative Example30 | CAM1 | | 500 | | | | 73.8 | 69.1 |
| Comparative Example31 | CAM1 | | 1000 | | | | 74.9 | 66.9 |
| Comparative Example32 | CAM1 | | 2000 | | | | 71.2 | 61.8 |
| Comparative Example33 | CAM1 | | 5000 | | | | 67.7 | 61.2 |
| Comparative Example34 | CAM1 | | | 200 | | | 60.8 | 57.1 |
| Comparative Example35 | CAM1 | | | 500 | | | 67.4 | 61.1 |
| Comparative Example36 | CAM1 | | | 1000 | | | 70.2 | 64.3 |
| Comparative Example37 | CAM1 | | | 2000 | | | 74.8 | 70.0 |
| Comparative Example38 | CAM1 | | | 3000 | | | 74.9 | 70.8 |
| Comparative Example39 | CAM1 | | | 4000 | | | 68.2 | 63.5 |
| Comparative Example40 | CAM1 | 500 | | | | | 66.8 | 69.2 |
| Comparative Example41 | CAM1 | 1000 | | | | | 71.0 | 76.1 |
| Comparative Example42 | CAM1 | 2000 | | | | | 80.9 | 83.7 |
| Comparative Example43 | CAM1 | 4000 | | | | | 78.8 | 83.1 |
| Comparative Example44 | CAM1 | 6000 | | | | | 72.9 | 79.2 |
| Comparative Example45 | CAM1 | | 2000 | 300 | | | 72.4 | 77.5 |
| Comparative Example46 | CAM1 | | 5000 | 350 | | | 76.6 | 82.3 |
| Comparative Example47 | CAM1 | 1000 | 2000 | | | | 73.2 | 75.6 |
| Comparative Example48 | CAM1 | 1500 | 3000 | | | | 78.6 | 81.2 |
| Comparative Example49 | CAM1 | | | 300 | 1000 | | 63.8 | 59.2 |

TABLE 2-continued

| | Lithium metal oxide particle | Amount in cathode active material(ppm; based on the total weight of the cathode active material) | | | | | Capacity retention rate(%; @60° C., 16 weeks) | Power output retention rate(%; @60° C., 16 weeks) |
|---|---|---|---|---|---|---|---|---|
| | | Al | Ti | Zr | B | Washing | | |
| Comparative Example50 | CAM1 | | | 350 | 1500 | | 68.2 | 62.1 |
| Comparative Example51 | CAM1 | | | 400 | 2000 | | 72.1 | 69.0 |
| Comparative Example52 | CAM1 | | | 450 | 2500 | | 77.9 | 72.3 |
| Comparative Example53 | CAM1 | | | 500 | 3000 | | 78.0 | 74.5 |
| Comparative Example54 | CAM1 | | | 550 | 4000 | | 70.9 | 66.1 |
| Comparative Example55 | CAM1 | 1000 | | 300 | | | 72.5 | 76.3 |
| Comparative Example56 | CAM1 | 1500 | | 350 | | | 75.2 | 77.4 |
| Comparative Example57 | CAM1 | 2000 | | 400 | | | 78.6 | 79.2 |
| Comparative Example58 | CAM1 | 2500 | | 450 | | | 81.0 | 82.2 |
| Comparative Example59 | CAM1 | 3000 | | 500 | | | 82.3 | 83.9 |
| Comparative Example60 | CAM1 | 4000 | | 550 | | | 75.1 | 77.0 |
| Comparative Example61 | CAM1 | 1000 | 2000 | 300 | | | 71.8 | 76.2 |
| Comparative Example62 | CAM1 | 1500 | 3000 | 350 | | | 77.7 | 84.1 |
| Comparative Example63 | CAM1 | 1000 | 2000 | 300 | | ○ | 75.5 | 79.4 |
| Comparative Example64 | CAM1 | 1500 | 3000 | 350 | | ○ | 81.6 | 87.5 |
| Comparative Example65 | CAM2 | | | | | | 52.2 | 50.9 |
| Comparative Example66 | CAM2 | | | | | ○ | 54.7 | 53.9 |
| Comparative Example67 | CAM2 | 1000 | 2000 | 200 | | | 71.4 | 76.1 |
| Comparative Example68 | CAM2 | 1500 | 3500 | 300 | | | 75.6 | 81.4 |
| Comparative Example69 | CAM2 | 1000 | 2000 | 200 | | ○ | 75.0 | 80.1 |
| Comparative Example70 | CAM2 | 1500 | 3500 | 300 | | ○ | 79.2 | 85.4 |

Referring to Table 2, when using a cathode active material in which a coating containing aluminum, titanium, and zirconium in a certain amount was formed on a lithium metal oxide particle having a concentration gradient region, the discharge capacity and discharge power output was effectively maintained even after long-term standing at high temperature.

Additionally, when using the washed cathode active material, deterioration of discharge capacity and power output after high temperature storage was effectively suppressed.

What is claimed is:

1. A cathode active material for a lithium secondary battery, comprising:
   a lithium metal oxide particle having a concentration gradient; and
   a coating formed on the lithium metal oxide particle, the coating including aluminum, titanium and zirconium, and
   wherein a ratio of titanium to aluminum in the cathode active material is in a range from 1.7 to 2.7.

2. The cathode active material for a lithium secondary battery according to claim 1, a ratio of aluminum to zirconium in the cathode active material is in a range from 4 to 8.

3. The cathode active material for a lithium secondary battery according to claim 1, a ratio of aluminum to zirconium in the cathode active material is in a range from 5 to 6.

4. The cathode active material for a lithium secondary battery according to claim 1, wherein the lithium metal oxide particle comprises a core portion, a shell portion, and a concentration gradient region within at least a portion between the core portion and the shell portion.

5. The cathode active material for a lithium secondary battery according to claim 1, wherein the cathode active material includes 2,000 ppm to 4,000 ppm of aluminum, 4,000 ppm to 9,000 ppm of titanium, and 400 ppm to 700 ppm of zirconium based on the total weight of the cathode active material.

6. The cathode active material for a lithium secondary battery according to claim 1, wherein the coating further comprises boron.

7. The cathode active material for a lithium secondary battery according to claim 6, wherein boron is included in 100 ppm to 500 ppm based on the total weight of the cathode active material.

8. The cathode active material for a lithium secondary battery according to claim 1, wherein the lithium metal oxide particle has a secondary particle structure in which primary particles are aggregated.

9. The cathode active material for a lithium secondary battery according to claim 8, wherein the primary particle has a rod shape.

10. The cathode active material for a lithium secondary battery according to claim 1, wherein the lithium metal oxide particle comprises nickel and manganese, and
a concentration of nickel decreases and a concentration of manganese continuously increases in a direction a core portion to a shell portion.

11. The cathode active material for a lithium secondary battery according to claim 1, wherein the lithium metal oxide particle is represented by Chemical Formula 1 below:

$$Li_xNi_aM1_bM2_cO_y$$ [Chemical Formula 1]

wherein, in Chemical Formula 1 above, each of M1 and M2 includes at least one selected from a group consisting of Co, Mn, Na, Mg, Ca, Ti, V, Cr, Cu, Zn, Ge, Sr, Ag, Ba, Zr, Nb, Mo, Al, Ga and B, and
$0<x\leq1.1$, $1.98\leq y\leq2.02$, $0.6\leq a\leq0.95$ and $0.05\leq b+c\leq0.4$.

12. The cathode active material for a lithium secondary battery according to claim 11, wherein the lithium metal oxide particle is represented by Chemical Formula 2 below:

$$Li_xNi_aCo_dMn_eM3_fO_y$$ [Chemical Formula 2]

wherein, in Chemical Formula 2 above, M3 includes at least one selected from a group consisting of Na, Mg, Ca, Ti V, Cr, Cu, Zn, Ge, Sr, Ag, Ba, Zr, Nb, Mo, Al, Ga and B, and
$0<x\leq1.1$, $1.98\leq y\leq2.02$, $0.75\leq a\leq0.85$, $0.08\leq d\leq0.12$, $0.08\leq e\leq0.12$ and $0.15\leq d+e+f\leq0.25$.

13. The cathode active material for a lithium secondary battery according to claim 12, wherein the cathode active material includes 2,000 ppm to 3,000 ppm of aluminum, 4,000 ppm to 6,000 ppm of titanium and 400 ppm to 500 ppm of zirconium, based on the total weight of the cathode active material.

14. The cathode active material for a lithium secondary battery according to claim 11, wherein the lithium metal oxide particle is represented by Chemical Formula 3 below:

$$Li_xNi_aCo_dMn_eM3_fO_y$$ [Chemical Formula 3]

wherein, in Chemical Formula 3 above, M3 includes at least one selected from a group consisting of Na, Mg, Ca, Ti, V, Cr, Cu, Zn, Ge, Sr, Ag, Ba, Zr, Nb, Mo, Al, Ga and B, and
$0<x\leq1.1$, $1.98\leq y\leq2.02$, $0.86\leq a\leq0.9$, $0.07\leq d\leq0.11$, $0.01\leq e\leq0.05$ and $0.1\leq d+e+f\leq0.14$.

15. The cathode active material for a lithium secondary battery according to claim 14, wherein the cathode active material includes 2,500 ppm to 3,500 ppm of aluminum, 5,000 ppm to 9000 ppm of titanium and 400 ppm to 700 ppm of zirconium, based on the total weight of the cathode active material.

* * * * *